(12) United States Patent
Seynaeve et al.

(10) Patent No.: US 12,565,211 B2
(45) Date of Patent: Mar. 3, 2026

(54) METHODS AND SYSTEMS FOR TORQUE TRANSITIONING

(71) Applicant: Dana Belgium N.V., Flanders (BE)

(72) Inventors: Koen B. Seynaeve, Veldegem (BE);
Pieterjan Jozef M. Cooreman, Bruges
(BE); Christophe De Buyser,
Veldegem (BE); Kevin Vyncke, Bruges
(BE)

(73) Assignee: DANA BELGIUM N.V., Bruges (BE)

( * ) Notice: Subject to any disclaimer, the term of this
patent is extended or adjusted under 35
U.S.C. 154(b) by 698 days.

(21) Appl. No.: 17/813,557

(22) Filed: Jul. 19, 2022

(65) Prior Publication Data

US 2023/0030590 A1 Feb. 2, 2023

Related U.S. Application Data

(60) Provisional application No. 63/203,706, filed on Jul.
28, 2021.

(51) Int. Cl.
B60W 30/18 (2012.01)
B60W 50/10 (2012.01)

(52) U.S. Cl.
CPC ...... B60W 30/18127 (2013.01); B60W 50/10
(2013.01); B60W 2510/081 (2013.01); **B60W
2510/083** (2013.01)

(58) Field of Classification Search
CPC ..... B60W 30/18127; B60W 30/18036; B60W 2540/10; B60W 2540/16; B60W 50/10;
B60W 2510/081; B60W 2510/083; B60W
2520/06; B60W 2520/10; B60W
2710/083; B60W 10/08; Y02T 10/72
See application file for complete search history.

(56) References Cited

U.S. PATENT DOCUMENTS

| | | | |
|---|---|---|---|
| 6,910,988 B2 | 6/2005 | Carlsson | |
| 9,156,463 B2 | 10/2015 | Legner | |
| 9,707,965 B2 | 7/2017 | Mair | |
| 10,047,854 B2 | 8/2018 | Kelly et al. | |
| 2005/0143877 A1* | 6/2005 | Cikanek | B60W 20/00 |
| | | | 701/22 |
| 2012/0139329 A1* | 6/2012 | Fabini | B60T 7/042 |
| | | | 303/3 |
| 2013/0162009 A1* | 6/2013 | Mitts | B60L 7/26 |
| | | | 303/3 |
| 2013/0296130 A1* | 11/2013 | Banker | B60L 7/26 |
| | | | 477/209 |
| 2018/0312081 A1* | 11/2018 | Hancock | B60L 15/10 |
| 2019/0054913 A1* | 2/2019 | Lad | B60W 20/00 |
| 2022/0105925 A1* | 4/2022 | Naserian | B60W 10/184 |

* cited by examiner

*Primary Examiner* — Nhi Q Bui

(74) *Attorney, Agent, or Firm* — McCoy Russell LLP

(57) ABSTRACT

Methods and systems are provided for torque application
during a deceleration event initiated via a shift lever direc-
tion change request. In one example, adjusting a decelera-
tion torque towards a traction torque of a going to direction
at a vehicle standstill based on an actual vehicle speed and
an accelerator pedal position when the actual vehicle speed
is below a threshold vehicle speed and a shift lever position
is adjusted from a forward position to a reverse position.

20 Claims, 3 Drawing Sheets

METHODS AND SYSTEMS FOR TORQUE TRANSITIONING

CROSS REFERENCE TO RELATED APPLICATION

The present application claims priority to U.S. Provisional Application No. 63/203,706, entitled "METHODS AND SYSTEMS FOR TORQUE TRANSITIONING", and filed on Jul. 28, 2021. The entire contents of the above-listed application are hereby incorporated by reference for all purposes.

TECHNICAL FIELD

The present description relates generally to torque transitioning between regeneration torque and traction torque.

BACKGROUND AND SUMMARY

More and more vehicles may be equipped with electrical power sources in an effort to combat climate change. The electrical power sources may provide electric energy instead or in combination with traditional fuel sources to propel a vehicle. Vehicles may be configured with a number of built-in systems and methods for regenerating an electrical energy supply so that a number of events in which electrical energy may be used is increased. One such method may include regenerative braking, which may operate an electrical motor as a generator and replenish a portion of the electrical energy supply.

The inventors have identified some issues with torque applications during a transition in and out of regenerative braking. For example, as a direction change in acceleration occurs due to an accelerator pedal being depressed, a torque jump may occur, which may be undesired. The torque jump may include a mismatch between an accelerator pedal position and a current torque output. In some examples, a vehicle operator may press the accelerator pedal while a regeneration torque is being applied. The regeneration torque may not match a traction torque at the standstill resulting in a torque jump to change the current torque to the requested torque. This rapid change may create a jerk on the electric machine, which may be undesirable for the vehicle operator.

In one example, the issue described above may be at least partially solved by a method for adjusting a deceleration torque as a function of an actual vehicle speed and an accelerator pedal position when the actual vehicle speed is below a threshold vehicle speed. In this way, the vehicle may decrease in speed as desired while transitioning a regeneration torque (e.g., the deceleration torque) to the traction torque of the going to direction at a vehicle standstill and for an actual accelerator pedal percentage to avoid the torque jump.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
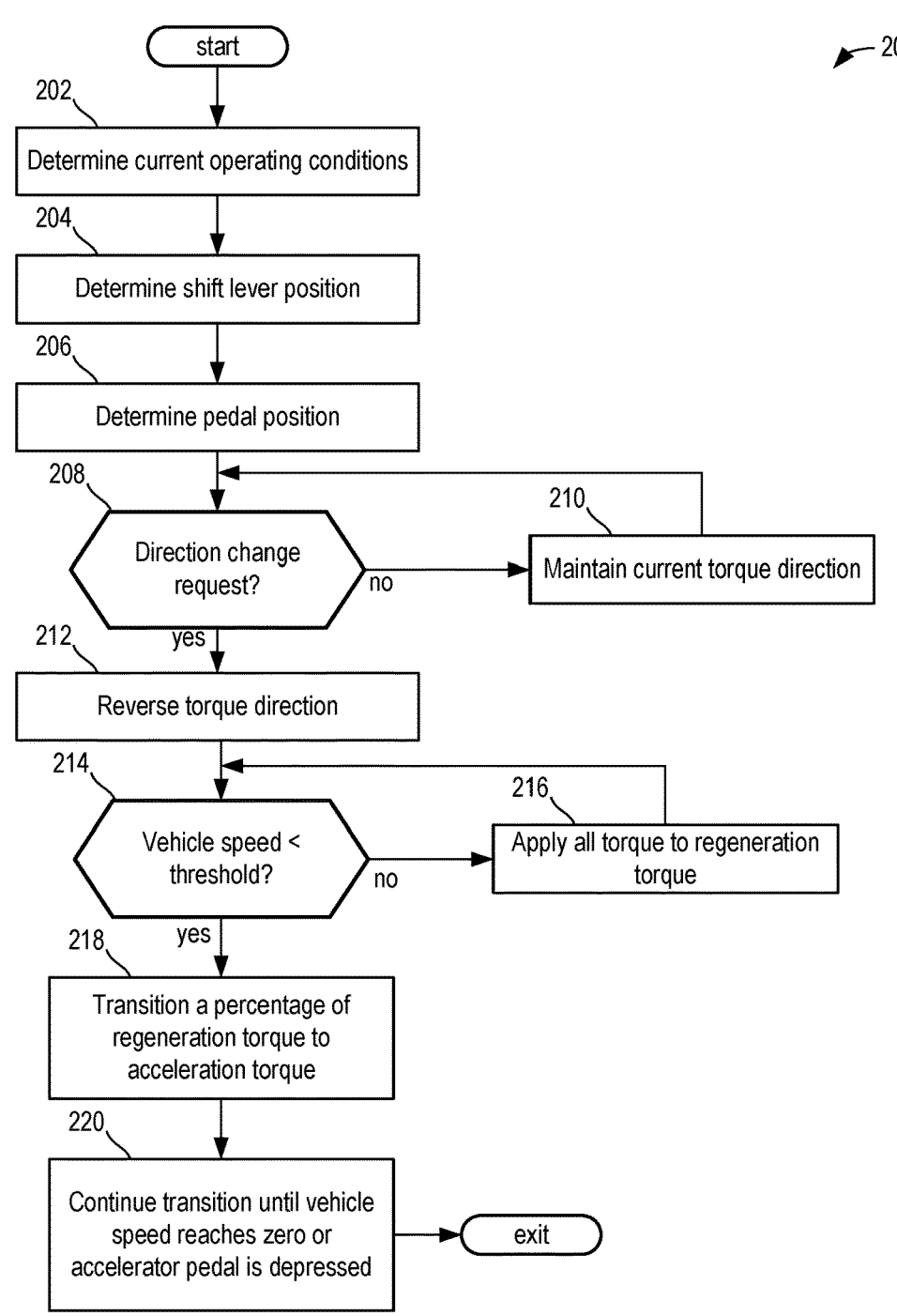
FIG. 2 shows a method for transitioning a torque direction in response to conditions.
Figure 3:
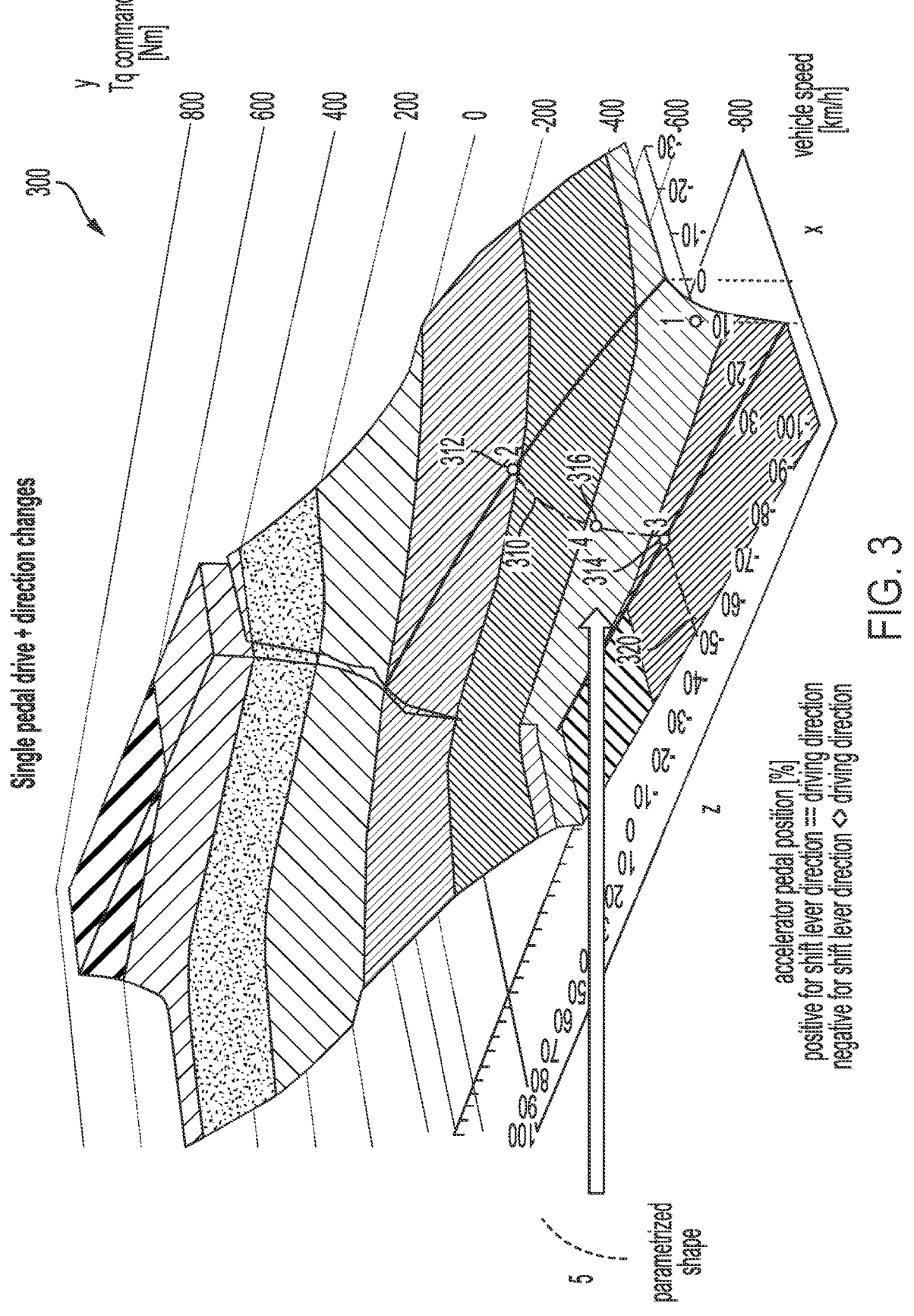
FIG. 3 shows a graphical example of a torque transition map.

The following description relates to methods and system for adjusting torque distribution during a deceleration/re-generation event. Regenerative braking may be executed on the vehicle of FIG. 1, which is illustrated as a partially electric vehicle. However, it will be appreciated that the examples and routines described herein may be executed on an all-electric vehicle without departing from the scope of the present disclosure. A method for transition a torque direction in response to deceleration conditions is illustrated in FIG. 2. A graphical example of a torque transition map customizable to different vehicle configurations and vehicle conditions is illustrated in FIG. 3.

Figure 1:
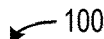
FIG. 1 shows a schematic of a vehicle comprising an electric motor.

Turning now to FIG. 1, it shows a vehicle 100 comprising a first shaft 102 and a second shaft 112. The first shaft 102 may be configured to drive a first set of wheels 104 proximal to a vehicle front end 101 and the second shaft 112 may be configured to drive a second set of wheels 114 proximal to a vehicle rear end 111. In one example, the first shaft 102 is arranged near a front of the vehicle 100 and the second shaft 112 is arranged near a rear of the vehicle 100.

A battery 132 may be configured to supply electrical energy to an electric motor 110. The electric motor 110 may drive a transmission 120. The transmission 120 may include a first output coupled to the first shaft 102 and a second output coupled to the second shaft 112.

The vehicle 100 is an all-electric vehicle comprising one or more batteries for powering one or more electric motors to drive the vehicle. In one example, the vehicle 100 is an all-electric passenger vehicle. In some examples, addition-ally or alternatively, the vehicle 100 may be a hybrid vehicle including an engine configured to supply power to one or more of the first shaft 102 and the second shaft 112. Additionally or alternatively, in some embodiments, the vehicle 100 may be a locomotive, port machinery, or other off-highway vehicle (OHV).

The vehicle 100 further includes a controller 12. The controller 12 may include memory, including non-transitory memory. The controller 12 may include instructions stored on non-transitory memory thereof that when executed enable the controller to adjust a torque direction in response to a position of a shift lever 14. The controller 12 may actuate the transmission 120 via a hydraulic control valve 18. In one example, the position of the shift lever 14 may be actuated to a forward position or a reverse position. The controller 12 may be configured to adjust an amount of torque of the electric motor 110 to be applied in a first direction if the position of the shift lever 14 is in the forward position or in a second direction if the position of the shift lever 14 is in the reverse position. The amount of torque may be further based on a pedal position of a pedal 16. In one example, the pedal 16 is an accelerator pedal with a pedal position sensor configured to sense a position of the pedal and provide the sensed position to the controller. The vehicle operator may actuate the pedal 16.

In one example, the first direction is a direction of travel of the vehicle corresponding to the shift lever position prior to a direction change (i.e. the coming from direction). The second direction is a direction opposite to the direction of travel of the vehicle, and corresponding to the shift lever direction once the direction shift is triggered (i.e. a going to direction).

In one example, the first direction is forward, being the direction of travel of the vehicle, equal to the shift lever position prior to a direction change. Herein, torque in the forward direction is either positive, when accelerator pedal is sufficiently pressed, zero for intermediate accelerator pedal position, or negative, when the accelerator pedal is released beyond a determined position based on current vehicle speed. Once the shift lever is changed to reverse, torque in the forward direction becomes negative, while the rotation of the motor is still positive (the vehicle is still moving forward). The opposite sign of the torque and speed of the motor at that time create regenerative braking on the motor and vehicle. The vehicle slows down to standstill. During the slowing down to standstill, the controller 12 gradually adjusts the negative torque (which is still regenerative due to positive speed) for finally matching the negative torque (which is traction torque due to zero speed) of reverse direction at vehicle standstill.

In one example, the controller 12 may include instructions stored on non-transitory memory thereof that when executed enable the controller 12 to adjust a direction of torque in response to the position of the shift lever 14. The instructions may further enable the controller 12 to adapt a portion of applied torque as negative torque while regenerative braking is still occurring as a vehicle approaches a stop. The adaptation may continue increasing the portion of applied torque as negative torque until an inflection point is reached (e.g., 0 torque) at the vehicle stop. By doing this, a torque jump may be reduced or prevented.

In one example, regenerative braking may include where motion of one or more wheels is resisted. The torque generated by the wheel is converted into charge and the motor is operation is switched to function as a generator. In one example, depending on a magnitude in which the accelerator pedal is tipped out, brakes may or may not be used in concert with regenerative braking. Herein, tip-in refers to a depression of the pedal and tip-out refers to a release of the pedal. For example, if a rate of deceleration due to the regenerative braking is not commensurate with a requested braking magnitude determined via the position of the accelerator pedal (more tipped out corresponding to a higher rate of deceleration being requested), then brakes may be activated without a vehicle operator depressing a brake pedal. During the regenerative braking, a load of an electrical energy supply may be replenished. In one example, a state of charge (SOC) of a battery may increase to a more recharged state during the regenerative braking. That is to say, the SOC may increase in percentage, wherein the SOC percentage may be any value from 0 to 100%.

Turning now to FIG. 2, it shows a method 200 for transitioning vehicle torque from a positive direction to a negative direction, or vice-versa. In one example, the method 200 of the present disclosure may be configured to transition a regenerative torque toward a traction torque during direction change execution. The transitioning may be non-linear and based on an actual vehicle speed. Instructions for carrying out method 200 may be executed by a controller based on instructions stored on a memory of the controller and in conjunction with signals received from sensors of the vehicle system, such as the sensors described above with reference to FIG. 1. The controller may employ actuators of the vehicle system to adjust operation, according to the method described below.

At 202, the method 200 may include determining current operating parameters. Current operating parameters may include but are not limited to one or more of a vehicle speed, a shift lever position, an accelerator pedal position, and a battery state-of-charge (SOC).

At 204, the method 200 may include determining the shift lever position. The shift lever (e.g., shift lever 14 of FIG. 1) may be in a forward position or in a reverse position. The forward position may include where a vehicle front end faces a direction of applied torque and the reverse direction may include where a vehicle rear end faces a direction of applied torque. The shift lever position may be determined via a position sensor.

At 206, the method 200 may include determining a pedal position. In one example, the pedal position is a position of an accelerator pedal (e.g., pedal 16 of FIG. 1). The position of the accelerator pedal may be proportional to an amount of positive or negative torque applied in the forward direction for the forward position of the shift lever or in a reverse direction for the reverse position of the shift lever. The accelerator pedal position may be sensed by a pedal position sensor, wherein the pedal position sensor may provide feedback to the controller as described above.

At 208, the method 200 may include determining if a direction change is requested. A direction change may be requested if the position of the shift lever is changed from the forward to the reverse position or vice-versa.

At 210, the method 200 may include maintaining a current torque direction if a direction change is not requested. Maintaining the current torque direction may include focusing all torque in the direction associated with the position of the shift lever. For example, if a shift lever direction matches a vehicle driving direction or if the vehicle is at a standstill, then the controller may apply torque according to a single pedal drive map, as shown in FIG. 3. The torque applied may be positive if the accelerator pedal is pressed beyond a determined position, zero if the accelerator pedal is at the determined position, and negative if the accelerator pedal is inclined (e.g., released) out of the determined position. The determined position may be based on a current vehicle speed where at the determined position the current vehicle speed is maintained.

At 212, the method 200 may include reversing a torque direction if a direction change is requested. Reversing the torque direction may include adjusting a portion or all of a torque to an opposite direction. In one example, at least a portion of the torque used in the going to direction is switched to the coming from direction, wherein the portion of the torque with its direction switched resists a direction of vehicle travel.

At 214, the method 200 may include determining if a vehicle speed is less than a threshold vehicle speed. In one example, the threshold speed is based on a positive, non-zero number. In one example, the threshold speed may be based on a parametrizable vehicle speed in a vehicle coming from direction. Said another way, the threshold speed may be based on a parameter programmed in memory of the controller, as shown in FIG. 3.

If the vehicle speed is not less than (e.g., greater than or equal to) the threshold speed, then the method 200 may proceed to 216, which includes applying all torque toward a regeneration torque. As such, a torque transition based on the map of FIG. 3 may not be initiated. In one example, all torque corresponds to torque adjustable by the controller 12 and not to all torque of the motors of the vehicle. Said another way, a configurable parameter is defined by determining a current maximum regenerative torque allowed by the driveline, which may be less than a total maximum the motors can deliver. By doing this, a braking effect may be modulated.

If the vehicle speed is less than the threshold speed, then the method 200 may proceed to 218, which includes transitioning a percentage of regeneration torque (e.g., negative torque) to traction torque to be applied as torque at the vehicle stop. In this way, regenerative torque may be transitioned to traction torque during conditions where the shift lever is in the reverse position and the vehicle speed is less than the threshold speed, approaching a vehicle stop. In one example, the traction torque is an acceleration torque at a vehicle stand-still. In one example, the percentage may be non-linear. Additionally or alternatively, the percentage may be based on equation 1 below.

$$Tthr-((Tthr-(-TO)\times trans\ \%))=Regen\ torque\ setpoint \quad (equation\ 1)$$

Values for the terms of equation 1 may be gathered from a map tracking regeneration torque and traction torque against vehicle speed. Tthr represents the regenerative torque, TO represents the traction torque at standstill. The transition percentage (trans %) may be 100% at standstill and 0% at a threshold speed. An example of the map is shown in FIG. 3. The map may be stored in memory of the controller, wherein one or more inputs including vehicle speed, accelerator pedal position, and the like may be inputted and outputs related to regeneration torque and traction torque may be provided along with a desired percentage balance between the two. In one example, the percentage may increase as the vehicle speed decreases further below the threshold speed such that an increased amount of torque is applied as traction torque. As described above, the percentage may be non-linear such that the transition of torque may follow an exponential, a logarithmic, or any other shaped plot. Upon reaching a vehicle speed of zero, the percentage may be 100% and all torque applied may be applied to traction torque.

Said another way, transitioning the torque during the regenerative braking may include where an amount of regenerative torque (e.g., negative torque and/or reverse torque) is reduced during the regenerative braking as the vehicle speed decreases below the threshold speed and approaches the vehicle stop. However, a positivity or a negativity of the torque (e.g., a direction of the torque) may be maintained upon reaching the vehicle stop such. By doing this, a sensation of the torque being adjusted upon arriving at the vehicle stop may be reduced and unnoticed by the vehicle operator.

In one example, in response to the shift lever changing to a direction opposite to a vehicle, the controller applies a regenerative torque to the motor. When the vehicle speed is less than the threshold speed, the regenerative torque gradually transitions from a predefined torque applied at or above the threshold speed, towards the traction torque of the going to direction at vehicle standstill. Thus, the sign of the regenerative torque in the coming from direction equals the sign of the traction torque of the going to direction. In this way, the value of the regenerative torque is controllably adjusted to the value of the traction torque of the going to direction, creating a smooth driving experience for a vehicle operator.

The method 200 may proceed to 220, which includes continuing the torque transitioning until the vehicle speed is zero or until the accelerator pedal is depressed. In one example, the torque transitioning may be adjusted in response to the accelerator pedal being depressed. Additionally or alternatively, the transitioning may be adjusted based on a change in accelerator pedal position, wherein the adjusting may include adjusting a percentage of the regenerative torque switched to traction torque during the regenerative braking based on the accelerator pedal position.

In one example, additionally or alternatively, the method includes transitioning the regeneration torque (negative torque) to a torque value that the system demands if the vehicle is at vehicle stop with the currently applied accelerator pedal position. The regeneration torque may include the same torque sign as the traction torque of the current driving direction. As such, transitioning from a regeneration torque set point to a traction torque set point may occur without changing the motor torque sign. The torque may be transitioning to a torque that may be applied when there is no longer a direction change while still allowing the vehicle to start driving in the other direction, relative to a direction of the torque prior to its transitioning. The torque is transitioned to the first set point that may be applied in the other direction, which may correspond to the set point when the vehicle is driving at 0 miles per hour (mph).

Turning now to FIG. 3, it shows a map 300 graphically illustrating a relationship between vehicle speed plotted along an x-axis, torque command plotted along a y-axis, and an accelerator pedal position percentage as a function of a shift lever position is plotted along a z-axis. Negative torque command values may correspond to regeneration torque (e.g. a torque that resists motion and results in the generation of electric energy) and positive torque command values may correspond to traction torque (e.g., torque that assists/provides vehicle motion). Positive accelerator pedal position percentages may correspond to accelerator pedal positions with the shift lever in the forward position and negative accelerator pedal position percentages may correspond to accelerator pedal positions with the shift lever in the reverse position. In one example, 0% accelerator pedal position may correspond to a pedal position with a highest amount of tip-out, resulting in regenerative braking. More tip-in results in acceleration of the vehicle.

Vehicle speed corresponds to a current/actual vehicle speed. The vehicle speed may be measured and/or calculated via the controller. A positive vehicle speed corresponds to a forward direction of vehicle travel and a negative vehicle speed corresponds to a reverse direction of vehicle travel.

Arc 310 illustrates one example of a parametrized shape of the transition. Line 320 may illustrate a portion prior to the transition where all torque (e.g., a max torque) is applied as regeneration torque and the transitioning has not started due to the vehicle speed being greater than the threshold speed. At point 314, the adaptation is 0% with the regeneration torque at the threshold speed (e.g., 10 km/h in the example of FIG. 3). Once the vehicle speed decreases below the threshold speed toward 0, the adaptation of the torque shifts and increases from 0, following the path of the arc 310 from point 314 to point 312. At point 312, the adaptation may be equal to 100%, such that the torque at the vehicle stop equals the traction torque defined in the going to direction. The torque sign is maintained, as shown in FIG. 3 during the direction change, from 320, over 314, over 310, and to point 312, where the torque sign remains negative. After the direction change to reverse (e.g., beyond 312), the torque remains negative but is applied as traction torque. Thus, negative torque in the forward direction is regeneration torque and negative torque in the reverse direction is traction torque. Positive torque in the forward direction is traction torque and positive torque in reverse is regeneration torque.

At point 316, there may only be regeneration torque present. As such, there may not be traction torque. The regeneration torque value may gradually change based on the map 300 to traction torque following the point 316, which will be applied as traction torque at the vehicle stop (e.g., vehicle speed 0). For segments of the arc 310 where the vehicle speed is greater 0, only regeneration torque is applied. However, the amount of regeneration torque applied may be reduced once the vehicle speed is less than the threshold speed. In one example, the traction torque applied at the vehicle stop following the regenerative braking may be a function of the pedal position. In some examples, additionally or alternatively, the traction torque applied at the vehicle stop may increase as the pedal position decreases (e.g., becomes more negative).

In this way, a torque jump, resulting in a jerk on an electric motor or other component of an at least partially electric vehicle may be avoided. A regeneration torque may receive 100% of a torque as a function of actual vehicle speed and an applied accelerator pedal position in response to the vehicle speed remaining above a threshold speed in a coming-from direction. This may result in the vehicle decelerating. Once the vehicle speed is below the threshold speed, the torque may be adapted and/or transitioned towards a traction torque defined at a vehicle standstill for the actual accelerator pedal position in a going-to direction. The adaptation and/or transition may be defined as a percentage of torque and balanced in a non-linear manner. The percentage of torque may be parametrized for a variety of different conditions and different vehicle configurations.

In one example, if a vehicle is in a reverse driving direction, then a going to torque direction may include a negative traction torque. If a vehicle operator adjusts the shift lever from a reverse position to a forward position, then the going to direction is reversed, from reverse to forward, where the front end of the vehicle becomes the leading edge rather than the rear end. During the transition from forward to reverse, the torque is initially regeneration torque since an electro-motor is rotating in reverse. This may slow down the vehicle to a stop. At the stop, if an accelerator pedal is still depressed and the shift lever is in a forward position, a positive torque may be applied as a traction torque. Thus, during a position change of the shift lever, positive torque continues to be applied, where the positive torque is regeneration torque while the electro-motor is spinning and traction torque once the electro-motor is stopped.

The disclosure provides support for a method including adjusting a regenerative torque towards a traction torque at a vehicle standstill based on an actual vehicle speed and an accelerator pedal position when the actual vehicle speed is below a threshold vehicle speed and a shift lever position is adjusted from a forward position to a reverse position. A first example of the method further includes applying a max torque as regenerative torque in response to the actual vehicle speed being greater than or equal to the threshold vehicle speed. A second example of the method, optionally including the first example, further includes decelerating a vehicle, wherein the regenerative torque is in a coming from direction and the traction torque is in a going to direction relative to a direction of vehicle travel. A third example of the method, optionally including one or more of the previous examples, further includes where adjusting the regenerative torque is non-linear. A fourth example of the method, optionally including one or more of the previous examples, further includes applying the traction torque prior to a vehicle standstill. A fifth example of the method, optionally including one or more of the previous examples, further includes where the regenerative torque resists vehicle motion.

The disclosure further provides support for a system including a vehicle, a battery coupled to an electric machine, a shift lever coupled to a controller, and an accelerator pedal coupled to the controller, the controller comprising computer-readable instructions stored on memory thereof that when executed cause the controller to apply torque as regenerative torque when regenerative braking is occurring and a vehicle speed is greater than or equal to a threshold speed, and transition a percentage of regenerative torque to traction torque when regenerative braking is occurring and the vehicle speed is less than the threshold speed. A first example of the system further includes where the transition follows an exponential curve. A second example of the system, optionally including the first example, further includes where the transition follows a logarithmic curve. A third example of the system, optionally including one or more of the previous examples, further includes where the transition follows a map plotting a vehicle speed, a torque command, and a position of the accelerator pedal. A fourth example of the system, optionally including one or more of the previous examples, further includes where the instructions further enable the controller to adjust the regenerative torque to be equal to the traction torque at a vehicle stop. A fifth example of the system, optionally including one or more of the previous examples, further includes where a rate of the transition of the regenerative torque decreases as the vehicle approaches a vehicle stop after the vehicle speed is less than the threshold speed. A sixth example of the system, optionally including one or more of the previous examples, further includes where the regenerative torque resists vehicle motion and the traction torque promotes vehicle motion. A seventh example of the system, optionally including one or more of the previous examples, further includes where a torque sign is maintained during an entirety of the transition. An eighth example of the system, optionally including one or more of the previous examples, further includes where the instructions further enable the controller to adjust the transition based on a position of the accelerator pedal, the adjusting based on a map plotting a vehicle speed, a torque command, and the position of the accelerator pedal.

The disclosure provides additional support for a system for an electric vehicle including a battery coupled to an electric machine, a shift lever coupled to a controller, and an accelerator pedal coupled to the controller, wherein the controller comprises computer-readable instructions stored on memory thereof that when executed cause the controller to apply torque as regenerative torque when regenerative braking is occurring and a vehicle speed is greater than or equal to a threshold speed, and transition a percentage of regenerative torque to traction torque when regenerative braking is occurring and the vehicle speed is less than the threshold speed, wherein the transition is based on a map plotting a vehicle speed, a torque command, and a position of the accelerator pedal. A first example of the system further includes where the transition follows a parametrized curve. A second example of the system, optionally including the first examples, further includes where the percentage increases as the vehicle approaches a vehicle stop. A third example of the system, optionally including one or more of the previous examples, further includes where an amount of regenerative torque is equal to an amount of traction torque at the vehicle stop. A fourth example of the system, optionally including one or more of the previous examples, further includes where the instructions further enable the controller to adjust the transition in response to the accelerator pedal being depressed.

Note that the example control and estimation routines included herein can be used with various vehicle system configurations. The control methods and routines disclosed herein may be stored as executable instructions in non-transitory memory and may be carried out by the control system including the controller in combination with the various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting a regenerative torque towards a traction torque at a vehicle standstill based on an actual vehicle speed and an accelerator pedal position when the actual vehicle speed is below a threshold vehicle speed and a shift lever position is adjusted from a forward position to a reverse position.

2. The method of claim 1, further comprising applying a max torque as regenerative torque in response to the actual vehicle speed being greater than or equal to the threshold vehicle speed.

3. The method of claim 2, further comprising decelerating a vehicle, wherein the regenerative torque is in a coming from direction and the traction torque is in a going to direction relative to a direction of vehicle travel.

4. The method of claim 1, wherein adjusting the regenerative torque is non-linear.

5. The method of claim 1, further comprising applying the traction torque prior to a vehicle standstill.

6. The method of claim 1, wherein the regenerative torque resists vehicle motion.

7. A system, comprising:
a vehicle;
a battery coupled to an electric machine;
a shift lever coupled to a controller; and
an accelerator pedal coupled to the controller;
the controller comprising computer-readable instructions stored on memory thereof that when executed cause the controller to:
apply torque as regenerative torque when regenerative braking is occurring and a vehicle speed is greater than or equal to a threshold speed; and
transition a percentage of regenerative torque to traction torque when regenerative braking is occurring and the vehicle speed is less than the threshold speed.

8. The system of claim 7, wherein the transition follows an exponential curve.

9. The system of claim 7, wherein the transition follows a logarithmic curve.

10. The system of claim 7, wherein the transition follows a map plotting a vehicle speed, a torque command, and a position of the accelerator pedal.

11. The system of claim 7, wherein the instructions further enable the controller to adjust the regenerative torque to be equal to the traction torque at a vehicle stop.

12. The system of claim 7, wherein a rate of the transition of the regenerative torque decreases as the vehicle approaches a vehicle stop after the vehicle speed is less than the threshold speed.

13. The system of claim 7, wherein the regenerative torque resists vehicle motion and the traction torque promotes vehicle motion.

14. The system of claim 7, wherein a torque sign is maintained during an entirety of the transition.

15. The system of claim 7, wherein the instructions further enable the controller to adjust the transition based on a position of the accelerator pedal, the adjusting based on a map plotting a vehicle speed, a torque command, and the position of the accelerator pedal.

16. A system for an electric vehicle, comprising:
a battery coupled to an electric machine;
a shift lever coupled to a controller; and
an accelerator pedal coupled to the controller; wherein
the controller comprises computer-readable instructions stored on memory thereof that when executed cause the controller to:
apply torque as regenerative torque when regenerative braking is occurring and a vehicle speed is greater than or equal to a threshold speed; and
transition a percentage of regenerative torque to traction torque when regenerative braking is occurring and the vehicle speed is less than the threshold speed, wherein the transition is based on a map plotting a vehicle speed, a torque command, and a position of the accelerator pedal.

17. The system of claim 16, wherein the transition follows a parametrized curve.

18. The system of claim 16, wherein the percentage increases as the vehicle approaches a vehicle stop.

19. The system of claim 18, wherein an amount of regenerative torque is equal to an amount of traction torque at the vehicle stop.

20. The system of claim 16, wherein the instructions further enable the controller to adjust the transition in response to the accelerator pedal being depressed.

* * * * *